(12) United States Patent
Dunne et al.

(10) Patent No.: US 8,936,727 B2
(45) Date of Patent: Jan. 20, 2015

(54) MULTIPLE BED TEMPERATURE CONTROLLED ADSORPTION

(75) Inventors: Stephen R. Dunne, Algonquin, IL (US); David A. Wegerer, Lisle, IL (US)

(73) Assignee: UOP LLC, Des Plaines, IL (US)

( * ) Notice: Subject to any disclaimer, the term of this patent is extended or adjusted under 35 U.S.C. 154(b) by 893 days.

(21) Appl. No.: 12/399,057

(22) Filed: Mar. 6, 2009

(65) Prior Publication Data

US 2010/0224565 A1    Sep. 9, 2010

(51) Int. Cl.
*B01D 15/24* (2006.01)
*B01D 15/00* (2006.01)
(Continued)

(52) U.S. Cl.
CPC ......... *B01J 20/3408* (2013.01); *B01D 53/0438* (2013.01); *B01D 53/0462* (2013.01); *B01D 53/261* (2013.01); *B01J 20/18* (2013.01); *B01J 20/28004* (2013.01); *B01J 20/2803* (2013.01); *B01J 20/2804* (2013.01); *B01J 20/3204* (2013.01); *B01J 20/3208* (2013.01); *B01J 20/3236* (2013.01); *B01J 20/3238* (2013.01); *B01J 20/3425* (2013.01); *B01J 20/3483* (2013.01); *B01D 2253/108* (2013.01); *B01D 2259/403* (2013.01); *B01D 2259/404* (2013.01); *B01J 2220/606* (2013.01)
USPC ........... 210/670; 210/660; 210/669; 210/689; 210/737; 210/774; 210/805

(58) Field of Classification Search
CPC .... B01D 15/24; B01D 15/00; B01D 53/0462; B01D 53/261; B01D 2259/404; B01D 53/0438; B01D 2253/108; B01D 2259/403; B01J 20/18; B01J 20/28004; B01J 20/2803; B01J 20/2804; B01J 20/3204; B01J 20/3208; B01J 20/3236; B01J 20/3238; B01J 20/3408; B01J 20/3425; B01J 20/3483; B01J 2220/606
USPC ......... 210/660, 669, 670, 689, 737, 767, 774, 210/805, 142, 149, 175, 180, 340
See application file for complete search history.

(56) References Cited

U.S. PATENT DOCUMENTS

| | | |
|---|---|---|
| 4,418,545 A | 12/1983 | Markfort |
| 4,451,270 A | 5/1984 | Roman |

(Continued)

FOREIGN PATENT DOCUMENTS

| | | |
|---|---|---|
| DE | 35 01 216 A1 | 7/1986 |
| DE | 37 02 190 A1 | 8/1988 |

(Continued)

OTHER PUBLICATIONS

B. Adnadevic et al., "Isoconversional Kinetic Analysis of Isothermal Selective Ethanol Adsorption on Zeolite Type NaZSM-5," *Chem. Eng. Technol.*, 2007, vol. 30, No. 9, pp. 1228-1234.

(Continued)

*Primary Examiner* — John Kim

(57) ABSTRACT

The systems and processes disclosed herein relate generally to multi bed temperature controlled adsorption for use in the recovery of sorbates that are removed from process streams by adsorption. Multi bed temperature controlled adsorber systems can include three or more temperature controlled adosrbers that operate in parallel. Each temperature controlled adsorber through a series of steps including an adsorption step, a first bed to bed interchange, a regeneration step, and a second bed to bed interchange.

3 Claims, 5 Drawing Sheets

(51) Int. Cl.
*B01J 20/34* (2006.01)
*B01D 53/04* (2006.01)
*B01D 53/26* (2006.01)
*B01J 20/18* (2006.01)
*B01J 20/28* (2006.01)
*B01J 20/32* (2006.01)

(56) References Cited

U.S. PATENT DOCUMENTS

| | | | |
|---|---|---|---|
| 4,479,814 A | 10/1984 | Oliker | |
| 4,594,856 A | 6/1986 | Rothmeyer | |
| 4,846,135 A | 7/1989 | Tiphaine | |
| RE33,352 E | 9/1990 | Roman et al. | |
| 5,116,510 A | 5/1992 | Sircar et al. | |
| 5,120,694 A * | 6/1992 | Dunne et al. | 502/68 |
| 5,571,477 A | 11/1996 | Nagy et al. | |
| 5,768,904 A | 6/1998 | Tagamolila et al. | |
| 5,802,870 A | 9/1998 | Arnold et al. | |
| 5,823,003 A | 10/1998 | Rosser, Jr. et al. | |
| 5,845,507 A | 12/1998 | Critoph et al. | |
| 5,953,927 A | 9/1999 | Tagamolila et al. | |
| 6,372,026 B1 | 4/2002 | Takemasa et al. | |
| 6,423,275 B1 | 7/2002 | D'Souza | |
| 6,591,630 B2 | 7/2003 | Smith et al. | |
| 6,601,404 B1 | 8/2003 | Roderick | |
| 6,607,583 B2 | 8/2003 | Cowles et al. | |
| 7,422,993 B2 | 9/2008 | Takewaki et al. | |
| 2002/0124727 A1* | 9/2002 | Hauck | 95/148 |
| 2004/0069144 A1* | 4/2004 | Wegeng et al. | 95/106 |
| 2004/0089001 A1 | 5/2004 | Kakiuchi et al. | |
| 2005/0006310 A1 | 1/2005 | Agrawal et al. | |
| 2005/0252235 A1 | 11/2005 | Critoph et al. | |
| 2007/0000769 A1 | 1/2007 | Brown | |
| 2007/0238906 A1 | 10/2007 | Brown et al. | |
| 2008/0023181 A1 | 1/2008 | Dunne et al. | |
| 2008/0034785 A1 | 2/2008 | Yanagai | |
| 2008/0039665 A1 | 2/2008 | Brown et al. | |
| 2008/0245653 A1 | 10/2008 | Zhong et al. | |
| 2009/0025403 A1 | 1/2009 | Kakiuchi et al. | |

FOREIGN PATENT DOCUMENTS

| | | |
|---|---|---|
| EP | 0 373 538 A1 | 6/1990 |
| EP | 0 394 947 A2 | 10/1990 |
| EP | 1101521 A1 * | 5/2001 |
| EP | 1 873 462 A1 | 1/2008 |
| FR | 2 619 106 | 2/1989 |
| FR | 2 699 087 | 6/1994 |
| JP | 60-129116 A | 7/1985 |
| WO | 95/30469 | 11/1995 |
| WO | 03/008091 A1 | 1/2003 |
| WO | 2008/155543 A2 | 12/2008 |
| WO | 2009/002893 A2 | 12/2008 |

OTHER PUBLICATIONS

L. Meljac, et al., "Isothermal Composite Adsorbent. Part I: Thermal Characterisation," *Applied Thermal Engineering*, 2007, vol. 27, Nos. 5-6, pp. 1009-1016 (Abstract Only).

J. Bonjour et al., "A TSA Process with Indirect Heating and Cooling: Parametric Analysis and Scaling-Up to Practical Sizes," *Chemical Engineering and Processing*, 2005, vol. 44, pp. 969-977.

M. Clausse et al., "Adsorption of Gas Mixtures in TSA Adsorbers under Various Heat Removal Conditions," *Chemical Engineering Science*, 2004, vol. 59, pp. 3657-3670.

M. Kanamori et al., "Production of Cold Heat Energy by Alcohol/Activated Carbon Adsorption Heat Pump with a Disk-Module-Type Adsorber." *Journal of Chemical Engineering of Japan*, 1997, vol. 30, No. 3, pp. 434-439.

M. K. Kuatbekov et al., "Internal Heat and Mass Transfer during Thermal Desorption," *Teor Osn Khim Tekhnol*, 1973, vol. 7, No. 3, w/English Abstract.

* cited by examiner

MULTIPLE BED TEMPERATURE CONTROLLED ADSORPTION

FIELD OF THE INVENTION

The systems and processes disclosed herein relate generally to multi bed temperature controlled adsorption for use in the recovery of sorbates that are removed from process streams by adsorption, and can include, for example, dehydrating water rich streams. One particular example relates to the dehydration of fermentation beer for use in producing motor fuel grade ethanol.

DESCRIPTION OF RELATED ART

The separation of specific components of process streams in certain applications can be accomplished by the use of adsorption to remove the desired component, followed by recovery of the component during regeneration of the adsorbent. Process streams utilized in such applications are typically liquid or gaseous, and can have a wide variety of compositional components depending upon the industrial application of the process.

Packed beds of adsorbent materials are typically used in adsorption processes. Adsorbent materials are generally in the form of spherical beads, or pellets. Adsorbent materials are typically oxygen-containing compounds, carbon-containing compounds, or polymer-based compounds. Oxygen-containing compounds can be, for example, hydrophilic and polar, including materials such as silica gel and zeolites. Carbon-based compounds can be, for example, hydrophobic and non-polar, including materials such as activated carbon and graphite. Polymer-based compounds can be, for example, polar or non-polar functional groups in a porous polymer matrix.

Typical adsorption processes utilizing packed beds can be thermal (temperature) swing adsorption (TSA) processes or pressure swing adsorption (PSA) processes. In operation, a process stream is introduced into a packed bed, and the adsorbent material contained therein removes a desired component, known as the sorbate, from the stream as it filters through the packed bed. After a given time period, the adsorbent material becomes saturated with the sorbate, and the adsorption process must be halted in order to regenerate the adsorbent and remove the sorbate. PSA processes utilize a de-pressurized regeneration gas that is introduced to the packed bed in a direction reverse to the flow of the process stream. After a regeneration cycle is complete, a new adsorption cycle can begin. TSA processes utilize heat to remove the sorbate from the adsorbent material. The heat in a typical; TSA process is added through the regeneration stream. Thus, the regeneration or purge gas must be utilized to supply all of the heat required to heat the vessel, bed supports, and the adsorbent, as well a providing the energy to desorb the sorbate from the adsorbent. Generally, a large volume of regeneration gas is necessary to accomplish this task, which results in a very dilute regeneration effluent stream, which increases the cost of processes utilized to recover the sorbate from the regeneration effluent stream In applications where the sorbate is water, and the adsorption process is utilized for bulk water removal from process streams, adiabatic adsorption is generally employed, within certain water concentration limits and purification applications. Adsorbent materials that are widely employed in adiabatic adsorption for removing water from process streams include molecular sieves.

The adsorption and desorption reactions that occur during adiabatic adsorption are considered adiabatic since the adsorber and process fluid being treated constitute a system that does not exchange heat with any other adjacent stream within the adsorbent containing contactor. The dynamic nature of the adiabatic water adsorption process, specifically, temperatures rising during adsorption and falling during regeneration, necessarily reduces the adsorbent absolute and differential loading potentials, the latter due to less than perfect regeneration. Additionally, adiabatic operation of an adsorber results in a thermal front which generally moves coincidentally with the adsorption front and results in higher temperatures in the downstream direction. As a consequence, achievable product purities are lowered owing to the shift in equilibrium caused by the higher temperature. For bulk water removal applications, this imposes an upper limit on the water concentration of the process fluid to be treated. The upper limit on water concentration results because in adiabatic adsorption systems, which do not have heat removal capability, the heat liberation associated with a high water content stream feeding an adiabatic adsorber can drive the product end of the bed to a sufficiently high temperature to reduce, or even eliminate, the driving force for adsorption.

As a result, processes for removing water from a mixture containing water and an organic compound to be dehydrated, such as, for example, ethanol, commonly involve process steps to remove water from the mixture prior to the mixture undergoing adsorption.

For example, motor fuel grade ethanol (MFGE) consumer product specifications typically limit water concentrations to less than 1% by volume, and in many countries less than 0.5% by volume. Fuel ethanol (E-95) quality for use in the USA is governed by the specifications listed in ASTM D 4806, entitled "Standard Specification for Denatured Fuel Ethanol for Blending with Gasoline's for use as an Automotive Spark-Ignition Engine Fuel." The ASTM specification is a water content of 1% by volume. Because ethanol is hygroscopic and easily picks up water from ambient air and the distribution system, the MFGE process specification for water content of the MFGE product is typically tighter than the ASTM specification, and, in at least some instances, can require a maximum water content of about 0.5% by weight. It should be noted that a product stream having about 99% by volume ethanol and about 1% by volume water has about 98.75% by weight ethanol and 1.25% by weight water.

Industrial processes for producing motor fuel grade ethanol (MFGE) include fermentation of sugars, including sugars derived from starches and lignocellulose. The effluent from the fermentation process, commonly known as fermentation beer, is a water-rich mixture containing water, alcohols, soluble solids, and insoluble solids. The alcohol content of fermentation beer is primarily ethanol. Beer from fermentation typically has a very high water content, which can be in the range of about 70% by weight to about 90% percent by weight of the fermentation beer. The ethanol content of fermentation beer is dependent on the sugar source. For example, fermentation beer for producing ethanol from corn starch can typically have an ethanol content in the range of about 5% to about 15% by weight, such as an ethanol content of about 10% by weight of the fermentation beer. Generally, the ethanol content of fermentation beer is in the range of from about 3% by weight to about 20% by weight. Accordingly, concentrating and purifying the ethanol contained in fermentation beer to achieve an MFGE product that meets specifications entails removing the relatively large amount of water.

Separating ethanol from beer is usually accomplished through distillation up to the ethanol-water azeotropic mixture concentration, which is about 95% by weight ethanol, and subsequent drying via other means in order to meet the MFGE water specification. The distillation sequence generally involves separating solids and some water from the effluent stream of a fermentation process, such as through the use of a beer column or other suitable solids separation unit. The process stream from a solids separation unit, containing nominally from about 55% by weight to about 70% by weight ethanol is sent to a second distillation tower, also known as a Rectifier column, to obtain an ethanol-water overhead product near the ethanol-water azeotropic mixture concentration.

Dehydration of the ethanol-water overhead product can then be accomplished via pressure swing molecular sieve adsorption (PSA), or via other processes such as extractive distillation. The pressure swing molecular sieve adsorption (PSA) technology commonly used to dehydrate the ethanol-water overhead product is an adiabatic process, which is the reason that distillation is normally used to minimize the water in the ethanol-water mixture that feeds the PSA unit.

SUMMARY OF THE INVENTION

The systems and processes disclosed herein relate to the adsorption treatment of process streams utilizing multi bed adsorption to remove a compositional component therefrom in the form of a sorbate, and to the recovery of the sorbate during regeneration of the adsorbent material. In particular examples, the systems and processes disclosed herein can include multi bed temperature controlled adsorption for use in dehydrating water rich streams.

In one aspect, a system for sorbate removal in the adsorption treatment of a process streams provided that includes three or more temperature controlled adsorbers that operate in parallel. Each temperature controlled adsorber can include one or more adsorption flow passages and one or more heat transfer flow passages, and the one or more adsorption flow passages contain an adsorptive material coating that adsorbs the sorbate during the adsorption step. The temperature controlled adsorbers can be cycled through a series of steps including an adsorption step, a regeneration step, and at least one bed to bed interchange step.

In a second aspect, a process for sorbate removal in the adsorption treatment of a process stream provided that includes providing three or more temperature controlled adsorbers that operate in parallel. Each temperature controlled adsorber can have one or more adsorption flow passages and one or more heat transfer flow passages, and the one or more adsorption flow passages contain an adsorptive material coating. The temperature controlled adosrbers can be cycled through a series of steps including an adsorption step, a first bed to bed interchange, a regeneration step, and a second bed to bed interchange. Sorbate can be removed from the process stream during the step of adsorption.

BRIEF DESCRIPTION OF THE DRAWINGS

Specific examples have been chosen for purposes of illustration and description, and are shown in the accompanying drawings, forming a part of the specification.

FIG. 2a is a perspective view of a temperature controlled adsorber that can be used in the process of FIG. 1.

FIG. 2b is a close-up view of a portion of FIG. 2a.

FIG. 2c is a close-up view of another portion of FIG. 2a.

FIG. 2d shows a thickness of a portion of FIG. 2c.

FIG. 3 is a perspective view of a portion of a temperature controlled adsorber of FIG. 2a.

DETAILED DESCRIPTION

The systems and processes disclosed herein relate generally to multi bed temperature controlled adsorption for use in removing at least one compositional component from a process stream, and can be used, for example, for dehydrating water rich streams. In other examples, the compositional component of the process stream that is adsorbed can include an impurity, a contaminant, a valuable compound, a regulated compound, or any other component that can be removed from a process stream through an adsorption process. Examples of potential sorbates that can be recovered include, but are not limited to water, mercury, one or more volatile organic compounds (VOCs), $CO_2$, $NO_x$, one or more halocarbon refrigerants, and propylene.

Figure 1:
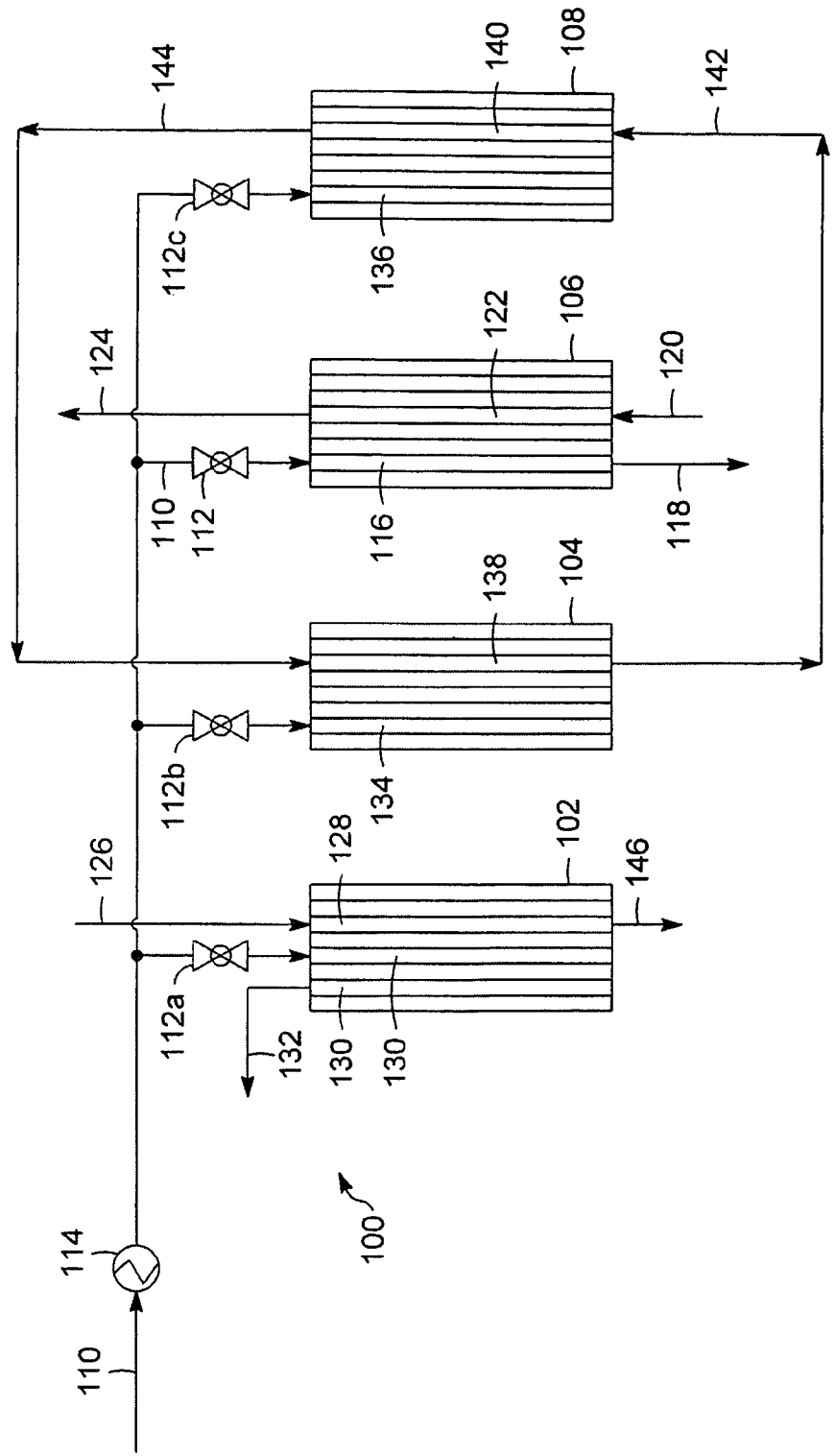
FIG. 1 illustrates a simplified process flow diagram for one embodiment of a multi bed temperature controlled adsorber system.

FIG. 1 illustrates a multi bed temperature controlled adsorption system 100 that includes a plurality of temperature controlled adsorbers, and in particular includes three or more temperature controlled adsorbers that operate in parallel. Multi bed temperature controlled adsorption system 100 can be used to dehydrate process streams containing ethanol and water for producing motor fuel grade ethanol (MFGE). Such systems and processes can preferably separate water from a mixture containing ethanol and water, and can simultaneously heat pump the heat in the ethanol and water feed mixture and water vapor desorbed during adsorbent regeneration to a level enabling useful heat recovery. In at least some instances, the heat recovered via heat pumping can reduce the cost of MFGE production by reducing the process hot and cold utility requirements of the MFGE production process.

Preferably, temperature controlled adsorption systems and processes can operate at conditions approaching isothermal conditions at heat transfer stream inputs. In such examples, one or more benefits over operating an adiabatic adsorbent system or process can be achieved. For example, the upper limit on water concentration in the fluid to be treated can also be eliminated, providing the ability for dehydration of extremely water-rich streams. Additionally, increased differential loading potential can be provided, with substantially lower loadings achieved during regeneration and higher loadings achievable during adsorption steps. Lower product dewpoints for water in the product stream, and smaller equipment size for a given duty can be also achieved. Other benefits can include reduction of purge gas requirements during the regeneration step and simultaneous increase of the potential for recovering high concentrations of adsorbate (i.e. water) in the regeneration gas. Flexibility in selecting the heating and cooling heat transfer media with minimal impact on desired process streams can also be provided. Further, extremely rapid thermal swing adsorption with cycle times at or below current adiabatic PSA separation processes can be achieved, which can result in smaller adsorber systems, which saves both capital and energy.

As shown in FIG. 1, multi bed temperature controlled adsorption system 100 includes four temperature controlled adsorbers that operate in parallel, including first temperature controlled adsorber 102, second temperature controlled adsorber 104, third temperature controlled adsorber 106, and fourth temperature controlled adsorber 108. In other examples, multi bed temperature controlled adsorption systems can include any suitable number of temperature controlled adsorbers, including but not limited to three, four, five, six, or more than six temperature controlled adsorbers. Each of the temperature controlled adsorbers is preferably an adsorbent containing contactor having internal indirect heat transfer passages. For example, any or all of the temperature controlled adsorbers 102, 104, 106 and 108 as illustrated in FIG. 1 can be a temperature controlled adsorber of the type illustrated generally at 40 in FIGS. 2a-2d, 3 and 4.

As shown in FIGS. 2a-2d, 3 and 4, temperature controlled adsorber 40 is a plate-fin type heat exchanger with one or more adsorption flow passages 53 and one or more heat transfer flow passages 55. The adsorption flow passages 53 contain an adsorptive material coating 46 that is applied by a wash-coating process. During the wash-coating process, the adsorption flow passages 53 are wash coated with a wash-coating fluid that contains an adsorbent material suitable for water adsorption including molecular sieves Type A and X, NaY, silica gel, alumina, and MOLSIV DDZ-70, which is produced by UOP. The wash-coating fluid also contains an organic polymer system and an organic solvent or carrier fluid. In one example, an adsorptive material coating 46 can contain a polymer and a zeolite, such as, for example, a Type 4A or a Type 3A zeolite.

A wash-coating process can comprise a step of heating a component to be coated, a step of contacting the surface of the component with a slurry comprising an adsorbent and a binder to form an adsorptive material coating 46, and a step of hardening the adsorptive material coating 46. For some applications, the step of contacting may comprise dipping the surface into the slurry or spraying the surface with the slurry.

The adsorptive material coating 46 may have an adsorptive coating thickness 77 (see FIG. 3) of between about 0.004 inches (0.010 cm) and about 0.052 inches (0.13 cm), preferably from about 0.014 inches (0.035 cm) to about 0.023 inches (0.058 cm). The adsorptive coating thickness 77 may be measured through the adsorptive material coating 46 and about perpendicular to the adsorption zone fin 58. The adsorptive coating thickness 77 may vary with application and may depend on factors including the dimensions of the adsorption zone fins 58, the desired dimensions of the adsorption flow passage 55 and the application. Co-pending U.S. patent application Ser. No. 11/461,271, entitled "Adsorption Heat Exchanger," the disclosure of which is hereby incorporated by reference in its entirety, describes the rudiments of the wash-coating process and some of the benefits that ensue in sorption cooling systems.

As illustrated in FIGS. 2a-2d, adsorption heat exchanger 40 can comprise at least one adsorption layer 50, at least one heat transfer layer 51 and a separator plate 52 positioned between and in contact with the adsorption layer 50 and the heat transfer layer 51. The adsorption heat exchanger 40 can comprise a plurality of adsorption layers 50 and a plurality of heat transfer layers 51. The adsorption layers 50 and heat transfer layers 51 may be positioned in a stacked arrangement of alternating adsorption layers 50 and heat transfer layers 51. In other words, one adsorption layer 50 may be positioned between two heat transfer layers 51; and one heat transfer layer 51 may be positioned between two adsorption layers 50. The adsorption heat exchanger 40 can comprise a plurality of separator plates 52 positioned such that one separator plate 52 is between and in contact with each adsorption layer/heat transfer layer pair. In other words, the separator plate 52 may be positioned between the adsorption layer 50 and the heat transfer layer 51. As defined herein, an adsorption layer/heat transfer layer pair may comprise an adsorption layer 50 and a heat transfer layer 51 positioned adjacent to one another.

The adsorption layer 50 may provide an adsorption flow passage 53 through the adsorption heat exchanger 40. The adsorption flow passage 53 may be in a direction parallel to an adsorption flow line 54. The heat transfer layer 51 may define a heat transfer flow passage 55 through the adsorption heat exchanger 40. The heat transfer flow passage 55 may be in a direction parallel to a heat transfer flow line 56. The adsorption flow line 54 may be about 90° from the heat transfer flow line 56. This type of system provides cross flow heat exchange. In alternative examples, an adsorption heat exchanger can operate with either parallel or counter flow heat transfer.

Figure 3:
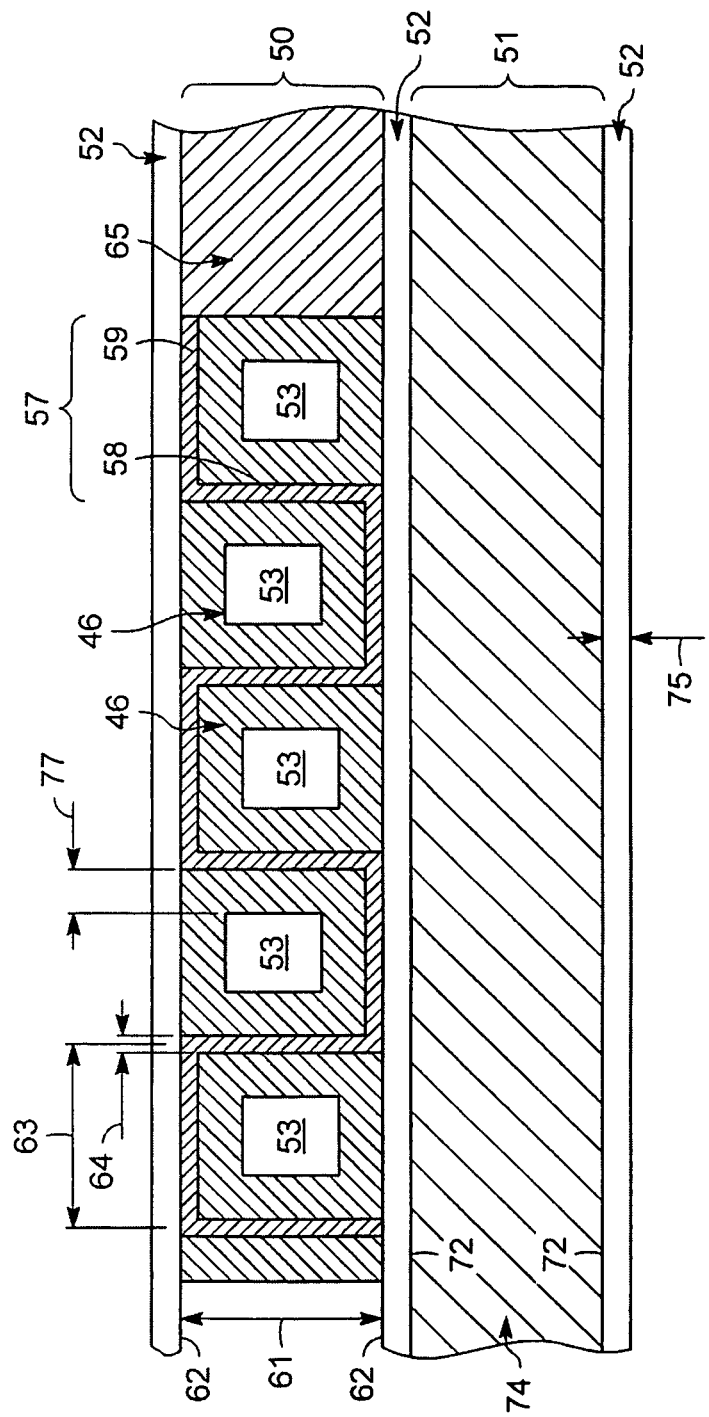

As depicted in FIG. 3, the adsorption layer 50 can include an adsorption zone corrugated sheet 57 and the adsorptive material coating 46. The adsorption zone corrugated sheet 57 may be in contact with and extend between two separator plates 52. The adsorption zone corrugated sheet 57 may comprise a plurality of adsorption zone fins 58 and a plurality of adsorption zone contact portions 59. The adsorption zone fin 58 may be the portion of the adsorption zone corrugated sheet 57 that is perpendicular to and extends between the separator plates 52. The adsorption zone contact portion 59 may be the portion of the adsorption zone corrugated sheet 57 that is parallel to and in contact with the separator plate 52.

Figure 2:
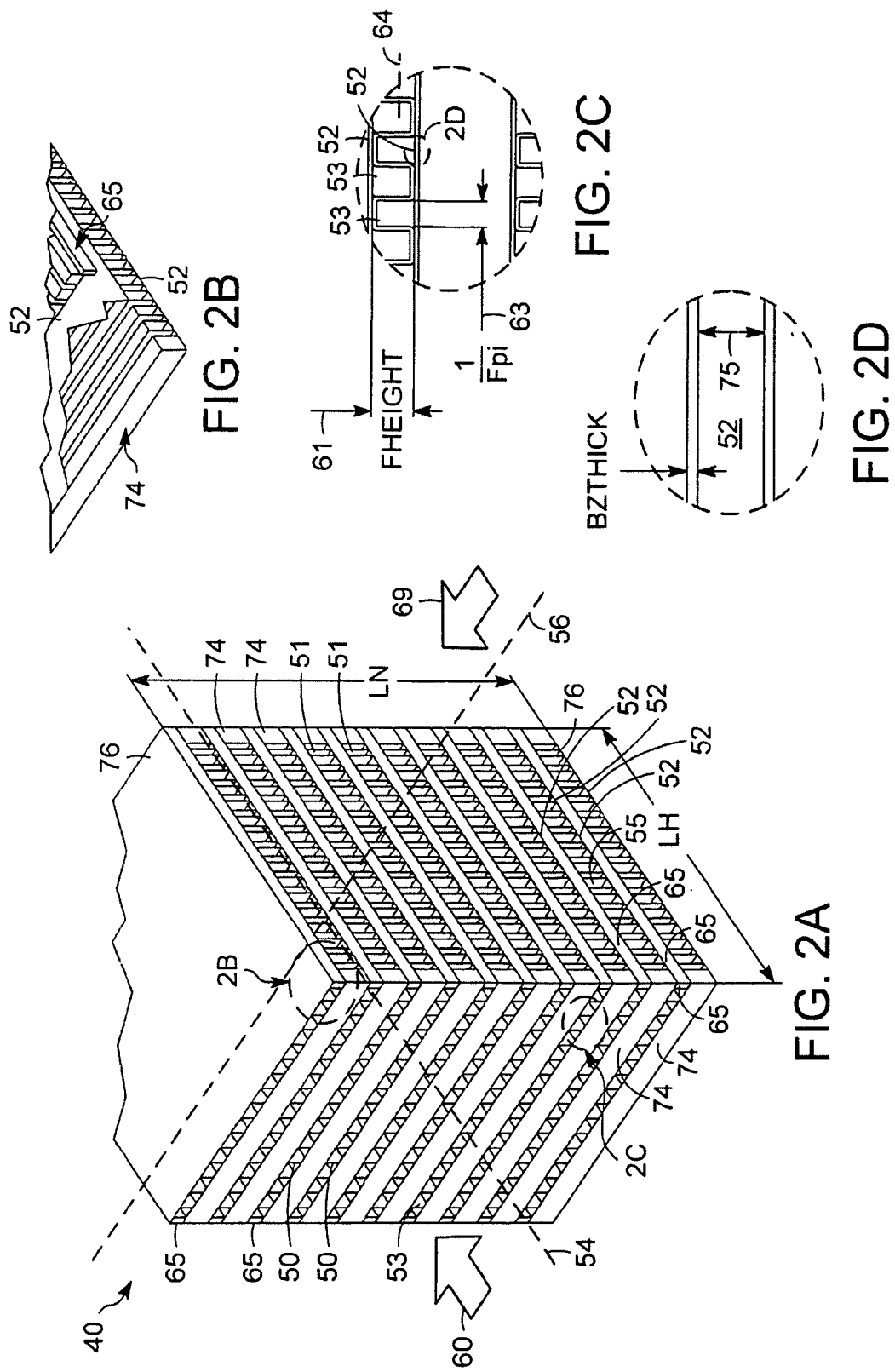

The adsorption zone fins 58 may be positioned about perpendicular to the separator plates 52 and may extend about parallel to the adsorption flow line 54. The adsorption zone fins 58 may direct the flow of an adsorbate rich stream 60, as shown in FIG. 2a, through the adsorption heat exchanger 40 and may provide a support for at least a portion of the adsorptive material coating 46. The adsorption zone fin 58 may be in contact with and extend between two separator plates 52. The adsorption fin height 61 may vary with application and may depend on factors including the composition of the adsorption zone fin 58 and the application. The adsorption fin thickness 64 may vary with application and may depend on factors including the composition of the adsorptive material coating 46 and the application. The density of adsorption zone fins (fins/inch) may vary with application and may depend on factors including the thickness of the adsorptive material coating 46 and the desired volume of the adsorption flow passage 53. The density of the adsorption zone fins 58 may be defined as the number of fins per inch of adsorption layer width as measured perpendicular to the adsorption flow line 54 and parallel to the separator plate 52.

The adsorption zone contact portions 59 may be positioned about parallel to and in contact with the separator plates 52. The adsorption zone contact portions 59 may be brazed to an adsorption zone facing side 62 of the separator plates 52. The adsorption zone contact portions 59 may provide a support for at least a portion of the adsorptive material coating 46, as depicted in FIG. 3. In other words, one side of the adsorption zone contact portion 59 may be brazed to the separator plate 52 and the other side may be coated with the adsorptive material coating 46. The adsorption contact width 63 is not an independent parameter. Once the density of the adsorption zone fins 58 and the adsorption fin thickness 64 have been specified the adsorption contact width 63 is a determinate value. The adsorption contact portion width 63 may vary and may depend on the desired density of the adsorption zone fins 58. The adsorption contact portion width 63 may be inversely proportion to the density of the adsorption zone fins 58.

For some applications, in lieu of the adsorption zone corrugated sheet 57, the adsorption layer 50 may comprise a plurality of adsorption zone fins 58 brazed directly to the separator plates 52. The adsorption zone fins 58 of the adsorption layer 50 may increase the surface area available for adsorptive material coating 46, thereby enhancing the adsorption/desorption efficiency of the adsorption heat exchanger 40.

The adsorption layer 50 may include two adsorption zone header bars 65, as depicted in FIG. 2*a*. The adsorption zone header bars 65 may be positioned parallel to the adsorption flow line 54. One adsorption zone header bar 65 may be positioned at one side of the adsorption layer 50 and the other adsorption zone header bar 65 may be positioned at the opposing side of the adsorption layer 50. The adsorption zone header bars 65 may be brazed to the separator plates 52 and may provide structural support to the adsorption heat exchanger 40.

The adsorption zone corrugated sheet 57, the adsorption zone fin 58, the adsorption zone contact portion 59 and adsorption zone header bar 65 each may comprise a material, such as but not limited to, aluminized Mylar®, a polymer composite, or a metal. Mylar® is a polyester film produced by E.I. Du Pont De Nemours and Company. Useful metals may include aluminum, copper, titanium, brass, stainless steel, other light metals and alloys with high conductivity, and graphite fiber composite materials. Components of the adsorption layer 50 may provide support for the adsorptive material coating 46.

The adsorptive material coating 46 of the adsorption layer 50 may define the adsorption flow passage 53, as depicted in FIG. 3. For some embodiments of the present invention, the adsorptive material coating 46 may define at least a portion of the adsorption flow passage 53. The adsorptive material coating 46 may be positioned on and in contact with the adsorption zone fins 58. Additionally, the adsorptive material coating 46 may be positioned on and in contact with the adsorption zone contact portions 59. Further, the adsorptive material coating 46 may be positioned on and in contact with at least a portion of the adsorption zone facing side 62 of the separator plates 52, as depicted in FIG. 3.

Figure 4:
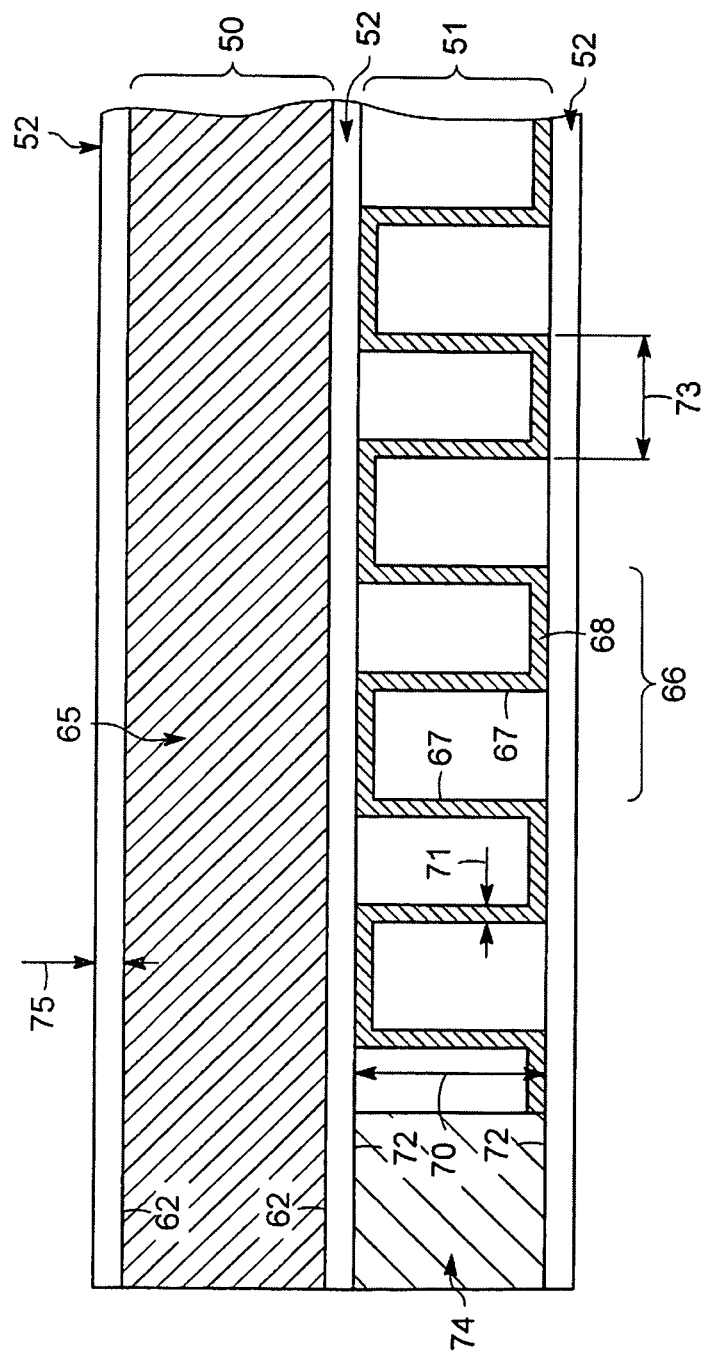
FIG. 4 is a rotated view of FIG. 3.

The heat transfer layer 51 may include a heat transfer zone corrugated sheet 66, as depicted in FIG. 4. The heat transfer zone corrugated sheet 66 may be in contact with and extend between two separator plates 52. The heat transfer zone corrugated sheet 66 may comprise a plurality of heat transfer zone fins 67 and a plurality of heat transfer zone contact portions 68. The heat transfer zone fin 67 may be the portion of the heat transfer zone corrugated sheet 66 that is perpendicular to and extends between the separator plates 52. The heat transfer zone contact portion 68 may be the portion of the heat transfer corrugated sheet 66 that is parallel to and in contact with the separator plate 52.

The heat transfer zone fins 67 may be positioned about perpendicular to the separator plates 52 and may extend about parallel to the heat transfer flow line 56. The heat transfer zone fins 67 may direct the flow of heat transfer fluid 69, as shown in FIG. 2*a*, through the adsorption heat exchanger 40. The heat transfer zone fins 67 may increase the heat transfer efficiency of the adsorption heat exchanger 40. The heat transfer zone fin 67 may be in contact with and extend between two separator plates 52. The heat transfer fin height 70 may vary with application and may depend on factors including the composition of the heat transfer zone fin 67 and the application. The heat transfer fin thickness 71 may vary with application and may depend on factors including the composition of the heat transfer fluid 69 and the application. The density of heat transfer zone fins (fins/inch) may vary with application and may depend on factors including the composition of the heat transfer fluid 69 and the desired volume of the heat transfer flow passage 55. The density of the heat transfer zone fins 67 may be defined as the number of fins per inch of the heat transfer layer width as measured perpendicular to the heat transfer flow line 56 and parallel to the separator plate 52.

The heat transfer zone contact portions 68 may be positioned about parallel to and in contact with the separator plates 52. The heat transfer zone contact portions 68 may be brazed to a heat transfer zone facing side 72 of the separator plates 52. The heat transfer contact portion width 73 may vary and may depend on the desired density of the heat transfer zone fins 67. The heat transfer contact portion width 73 may be inversely proportion to the density of the heat transfer zone fins 67.

For some applications, in lieu of the heat transfer zone corrugated sheet 66, the heat transfer layer 51 may comprise a plurality of heat transfer zone fins 67 brazed directly to the separator plates 52.

The heat transfer layer 51 may include two heat transfer zone header bars 74, as depicted in FIG. 2*a*. The heat transfer zone header bars 74 may be positioned parallel to the heat transfer flow line 56. One heat transfer zone header bar 74 may be positioned at one side of the heat transfer layer 51 and the other heat transfer zone header bar 74 may be positioned at the opposing side of the heat transfer layer 51. The heat transfer zone header bars 74 may be brazed to the separator plates 52 and may provide structural support to the adsorption heat exchanger 40.

The heat transfer zone corrugated sheet 66, the heat transfer zone fin 67, the heat transfer zone contact portion 68 and heat transfer zone header bar 74 each may comprise any suitable material, such as but not limited to, aluminized Mylar®, a polymer composite, or a metal. Useful metals may include aluminum, copper, titanium, brass, stainless steel, other light metals and alloys with high conductivity, and graphite fiber composite materials.

The separator plate 52 of the adsorption heat exchanger 40 may comprise a sheet material structure, as depicted in FIGS. 2*a-c*. The separator plate 52 may be positioned parallel to the layers 50, 51, as shown in FIGS. 3 and 4. One separator plate 52 may be positioned between and in contact with each adsorption layer/heat transfer layer pair. The separator plate 52 may prevent the flow of adsorbate 60 from entering the heat transfer layer 51 and prevent the flow of heat transfer fluid 69 from entering the adsorption layer 50. The separator plate 52 may comprise any suitable material, such as but not limited to, aluminized Mylar®, a polymer composite, or a metal. Useful metals may include aluminum, copper, titanium, brass, stainless steel, other light metals and alloys with high conductivity, and graphite fiber composite materials. The width and length of the separator plate 52 may vary and may be about equal to the width and length of the layers 50, 51.

The adsorption heat exchanger 40 further may comprise two side plates 76, as depicted in FIG. 2*a*. The side plates 76 may be positioned parallel to the layers 50, 51. One side plate 76 may be positioned at one side of the adsorption heat exchanger 40 and the other side plate 76 may be positioned at the opposing side of the adsorption heat exchanger 40. The side plates 76 may comprise any suitable material, such as but not limited to, aluminized Mylar®, a polymer composite, or a metal. For some applications, the side plates 76 may be brazed to and provide structural support for the adsorption heat exchanger 40.

Referring back to FIG. 1, a process stream 110 can be provided to at least one of the temperature controlled adsorbers 102, 104, 106 and 108. In at least some examples, process stream 110 can be the overhead stream from a solids separation unit, such as a beer column in a process for producing MFGE. In such examples, process stream 110 can contain from about 5% by weight water to about 85% by weight water. Process stream 110, or at least a portion of process stream 110, can be in a vapor phase. In some examples, process stream 110 can contain from about 55% by weight ethanol to about 70% by weight ethanol, and from about 25% by weight water to about 45% by weight water. Process stream 110 can have any suitable temperature and pressure. For example, process stream 110 can have a temperature of from about 70° C. to about 110° C. Additionally, process stream 110 can have a pressure of from about 30 Kpa to about 175 Kpa.

Process stream 110 can be directed to a temperature controlled adsorber that is undergoing an adsorption cycle. For illustrative purposes, third temperature controlled adsorber 106 will be described as undergoing adsorption, and first temperature controlled adsorber 102 will be described as undergoing regeneration. In such an example, second temperature controlled adsorber 104 and fourth temperature controlled adsorber 108 can be undergoing a bed to bed interchange of heat transfer fluid. It should be understood that during operation, the temperature controlled adsorbers 102, 104, 106 and 108 are preferably each cycled through a series of steps, which include an adsorption step, a regeneration step, and at least one bed to bed interchange step. It should also be understood that each temperature controlled adsorber in the system 100 has sufficient connections and feeds to function appropriately when undergoing any of the steps in an adsorption and regeneration cycle, although only a portion of the actual connections to each temperature controlled adsorber are illustrated in FIG. 1.

When third temperature controlled adsorber 106 is undergoing adsorption, process stream 110 can be provided to one or more inlets of third temperature controlled adsorber 106, such as by valve 112. The remaining temperature controlled adsorbers can be isolated from the process stream 110. For example, valves 112a, 112b and 112c can be utilized to cut off the flow of process stream 110 to temperature controlled adsorbers 102, 104 and 108, respectively. Optionally, process stream 110 can pass through a vapor superheater 114 prior to being provided to the third temperature controlled adsorber 106. Process stream 110 can flow through the one or more adsorption flow passages 116 of the third temperature controlled adsorber 106. Water can be adsorbed by an adsorptive material coating in the one or more adsorption flow passages 116.

The heat of adsorption of the water that is generated in third temperature controlled adsorber 106 can be removed by indirect heat exchange with a cooling fluid 120. Cooling fluid 120 can be provided to the one or more heat transfer flow passages 122 of the third temperature controlled adsorber 106, and can exit the third temperature controlled adsorber 106 as heated cooling fluid 124. Heated cooling fluid 124 can have a temperature that is greater than the temperature of the process stream 110.

As illustrated in FIG. 1, when third temperature controlled adsorber 106 is undergoing adsorption, first temperature controlled adsorber 102 can be undergoing regeneration. During regeneration, first temperature controlled adsorber 102 can be isolated from process stream 110 by valve 112a. A heating fluid 126 can be provided to and pass through the one or more heat transfer flow passages 128 of the first temperature controlled adsorber 102. Heating fluid 126 can be water vapor, and can preferably have a temperature of from about 150° C. to about 250° C. The heating fluid 126 provides heat via indirect heat exchange to the one or more adsorption flow passages 128 of the first temperature controlled adsorber 102. The heat provided by heating fluid 126 is preferably sufficient to provide the regeneration heat requirement for the one or more adsorption flow passages 130 of the first temperature controlled adsorber 102. Additionally, the pressure in the one or more adsorption flow passages 130 may be reduced to facilitate regeneration. Water that was adsorbed by the adsorptive material coating in the one or more adsorption flow passages 130 during the previous adsorption cycle of the first temperature controlled adsorber 102 is removed from the adsorptive material coating, and exits the first temperature controlled adsorber 102 as regeneration effluent stream 132. Regeneration effluent stream 132 is preferably in a vapor phase.

As heating fluid 126 passes through the one or more heat transfer flow passages 128, it loses heat and exits the first temperature controlled adsorber 102 as cooled heating fluid 146. Cooled heating fluid 146 can be a condensate, containing at least some liquid water and some water vapor, and can have a temperature of from about 150° C. to about 250° C., for example at about 185° C.

When third temperature controlled adsorber 106 is undergoing adsorption, and first temperature controlled adsorber 102 is undergoing regeneration, the second temperature controlled adsorber 104 and the fourth temperature controlled adsorber 108 are preferably undergoing a bed to bed interchange of heat transfer fluid. During bed to bed interchange, the second temperature controlled adsorber 104 and the fourth temperature controlled adsorber 108 can be isolated from the process stream 110 by valves 112b and 112c, respectively. The one or more adsorption flow passages 134 of the second temperature controlled adsorber 104 and the one or more adsorption flow passages 136 of the fourth temperature controlled adsorber 108 can be closed. The one or more heat transfer flow passages 138 of the second temperature controlled adsorber 104 and the one or more heat transfer flow passages 140 of the fourth temperature controlled adsorber 108 can be opened. Cool transfer fluid 142 from the second temperature controlled adsorber 104 can be provided to the fourth temperature controlled adsorber 108, and hot transfer fluid 144 from the fourth temperature controlled adsorber 108 can be provided to the second temperature controlled adsorber 104. In this example, the second temperature controlled adsorber 104 can be heated during the bed to bed interchange, and the fourth temperature controlled adsorber 108 can be cooled. In the four bed temperature controlled adsorber system illustrated in FIG. 1, the second temperature controlled adsorber 104 can be pre-heated during the bed to bed interchange in preparation to undergo regeneration in a subsequent step, and the fourth temperature controlled adsorber 108 can be pre-cooled during the bed to bed interchange in preparation to undergo adsorption in a subsequent step.

Table 1 below illustrates a series of stages that can be utilized to perform a cycle of adsorption and regeneration with a multi bed temperature controlled adsorption system, such as the four bed system 100 illustrated in FIG. 1. Table 1 illustrates a series of four stages, during which each adsorber undergoes steps including adsorption, a first bed to bed interchange, regeneration, and a second bed to bed interchange. The first bed to bed interchange can pre-heat the TCA prior to a subsequent regeneration step, and the second bed to bed interchange can pre-cool the TCA prior to a subsequent adsorption step.

TABLE 1

| Stage | TCA 1 | TCA 2 | TCA 3 | TCA 4 |
|---|---|---|---|---|
| #1 | HF | 4 | CF | 2 |
| #2 | 3 | HF | 1 | CF |
| #3 | CF | 4 | HF | 2 |
| #4 | 3 | CF | 1 | HF |

As shown in Table 1, stage one shows the temperature controlled adsorbers (TCAs) in a state as described above, with the third temperature controlled adsorber TCA 3 undergoing adsorption, the first temperature controlled adsorber TCA 1 undergoing regeneration, while the second temperature controlled adsorber TCA 2 and the fourth temperature controlled adsorber TCA 4 undergo bed to bed interchange. Each column of the row for stage one indicates the fluid being received by the respective TCA during that stage. As indicated in stage one, TCA 1 receives a heating fluid HF, TCA 2 receives fluid from TCA 4, TCA 3 receives a cooling fluid CF, and TCA 4 receives fluid from TCA 2.

Stages 2 through 4 of Table 1 show the progression of each TCA as it undergoes steps of adsorption, regeneration, and bed to bed interchange. Stage two of Table 1 shows a preferred state in a second stage that follows stage one. In stage two, TCA 2 is undergoing regeneration and receives a heating fluid HF, TCA 3 receives fluid from TCA 1, TCA 4 is undergoing adsorption and receives a cooling fluid CF, and TCA 1 receives fluid from TCA 3. Stage three of Table 1 shows a preferred state in a third stage that follows stage two. In stage three, TCA 3 is undergoing regeneration and receives a heating fluid HF, TCA 4 receives fluid from TCA 2, TCA 1 is undergoing adsorption and receives a cooling fluid CF, and TCA 2 receives fluid from TCA 4. Stage four of Table 1 shows a preferred state in a fourth stage that follows stage three. In stage four, TCA 4 is undergoing regeneration and receives a heating fluid HF, TCA 1 receives fluid from TCA 3, TCA 2 is undergoing adsorption and receives a cooling fluid CF, and TCA 3 receives fluid from TCA 1. Once stage four is complete, the adsorption and regeneration cycle can continue by returning to stage one.

Figure 5:
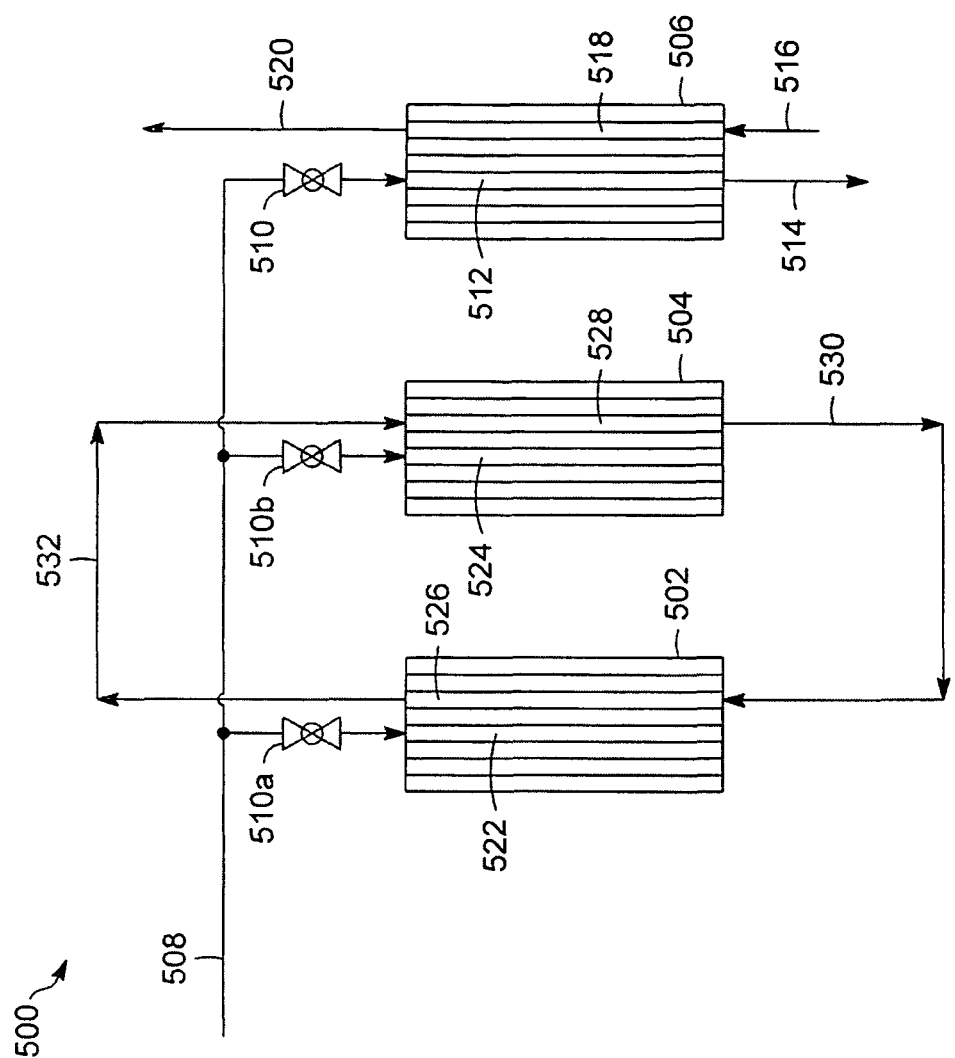
FIG. 5 illustrates a simplified process flow diagram for another embodiment of a multi bed temperature controlled adsorber system.

FIG. 5 illustrates a multi bed temperature controlled adsorption system 500 that includes three temperature controlled adsorbers that operate in parallel, including first temperature controlled adsorber 502, second temperature controlled adsorber 504, and third temperature controlled adsorber 506. A process stream 508 can be provided to at least one of the temperature controlled adsorbers 502, 504, and 506. In at least some examples, process stream 508 can be the overhead stream from a solids separation unit, such as a beer column in a process for producing MFGE, such as the exemplary process stream 110 discussed above.

Process stream 508 can be directed to a temperature controlled adsorber that is undergoing an adsorption cycle. For illustrative purposes, third temperature controlled adsorber 506 will be described as undergoing adsorption. In such an example, first temperature controlled adsorber 502 and second temperature controlled adsorber 504 can be undergoing a bed to bed interchange of heat transfer fluid. It should be understood that during operation, the temperature controlled adsorbers 502, 504, and 506 are preferably each cycled through a series of steps, which include an adsorption step, a regeneration step, and at least one bed to bed interchange step. It should also be understood that each temperature controlled adsorber in the system 500 has sufficient connections and feeds to function appropriately when undergoing any of the steps in an adsorption and regeneration cycle, although only a portion of the actual connections to each temperature controlled adsorber are illustrated in FIG. 5.

When third temperature controlled adsorber 506 is undergoing adsorption, process stream 508 can be provided to one or more inlets of third temperature controlled adsorber 506, such as by valve 510. The remaining temperature controlled adsorbers can be isolated from the process stream 508. For example, valves 510a, and 510b can be utilized to cut off the flow of process stream 508 to temperature controlled adsorbers 502 and 504, respectively. Process stream 508 can flow through the one or more adsorption flow passages 512 of the third temperature controlled adsorber 506. Water can be adsorbed by an adsorptive material coating in the one or more adsorption flow passages 512. In one example, the adsorptive material coating contains a polymer and a zeolite, such as, for example, a Type 4A or a Type 3A zeolite. The adsorption of the water generates heat, known as the heat of adsorption. The water adsorption process removes water from the process stream 508, and produces an MFGE product stream 514. MFGE product stream 514 can be less than 5% water by weight, less than 2% water by weight, or less than 1% water by weight. Preferably, MFGE product stream 514 contains from about 0.25% water by weight to about 1.25% water by weight. MFGE product stream 514 preferably contains greater than 98% by weight ethanol. MFGE product stream 514 can have any suitable temperature, and in one example can have a temperature of about 99° C. MFGE product stream 514 exits the third temperature controlled adsorber 506, and can be utilized in its desired application.

The heat of adsorption of the water that is generated in third temperature controlled adsorber 506 can be removed by indirect heat exchange with a cooling fluid 516. Cooling fluid 516 can be provided to the one or more heat transfer flow passages 518 of the third temperature controlled adsorber 506, and can exit the third temperature controlled adsorber 506 as heated cooling fluid 520. Heated cooling fluid 520 can have a temperature that is greater than the temperature of the process stream 508.

As illustrated in FIG. 5, when third temperature controlled adsorber 506 is undergoing adsorption, the first temperature controlled adsorber 502 and the second temperature controlled adsorber 504 are preferably undergoing a bed to bed interchange of heat transfer fluid. During bed to bed interchange, the first temperature controlled adsorber 502 and the second temperature controlled adsorber 504 can be isolated from the process stream 508 by valves 510a and 510b, respectively. The one or more adsorption flow passages 522 of the first temperature controlled adsorber 502 and the one or more adsorption flow passages 524 of the second temperature controlled adsorber 504 can be closed. The one or more heat transfer flow passages 526 of the first temperature controlled adsorber 502 and the one or more heat transfer flow passages 528 of the second temperature controlled adsorber 504 can be opened. Cool transfer fluid 530 from the second temperature controlled adsorber 504 can be provided to the first temperature controlled adsorber 502, and hot transfer fluid 532 from the first temperature controlled adsorber 502 can be provided to the second temperature controlled adsorber 504. In this example, the second temperature controlled adsorber 504 can be heated during the bed to bed interchange, and the first temperature controlled adsorber 502 can be cooled.

Table 2 below shows a series of stages that can be utilized to perform a cycle of adsorption and regeneration with a multi bed temperature controlled adsorption system, such as the three bed system 500 illustrated in FIG. 5. Table 2 illustrates a series of six stages, during which each adsorber undergoes steps including adsorption, a first bed to bed interchange, a second bed to bed interchange, regeneration, a third bed to bed interchange, and a fourth bed to bed interchange. The first bed to bed interchange and the second bed to bed interchange can pre-heat a TCA prior to undergoing a subsequent regeneration step. The third bed to bed interchange and the fourth bed to bed interchange can pre-cool a TCA prior to undergoing a subsequent adsorption step.

TABLE 2

| Stage | TCA 1 | TCA 2 | TCA 3 |
|---|---|---|---|
| #1 | HF | 3 | 2 |
| #2 | 2 | 1 | CF |
| #3 | 3 | HF | 1 |
| #4 | CF | 3 | 2 |
| #5 | 2 | 1 | HF |
| #6 | 3 | CF | 1 |

As shown in Table 2, stage two shows the temperature controlled adsorbers (TCAs) in a state as described above with respect to FIG. 5, with the third temperature controlled adsorber TCA 3 undergoing adsorption, while the first temperature controlled adsorber TCA 1 and the second temperature controlled adsorber TCA 2 undergo bed to bed interchange. Each column of the row for stage two indicates the fluid being received by the respective TCA during that stage. As indicated in stage two, TCA 1 receives fluid from TCA 2, TCA 2 receives fluid from TCA 1, and TCA 3 receives a cooling fluid CF. Table 2 shows that in the previous stage, stage one, TCA 1 undergoes regeneration and received a heating fluid HF, TCA 2 receives fluid from TCA 3, and TCA 3 receives fluid from TCA 2. In stage three, TCA 1 receives fluid from TCA 3, TCA 2 undergoes regeneration and receives heating fluid HF, and TCA 3 receives fluid from TCA 1. In stage 4, TCA 1 undergoes adsorption and receives a cooling fluid CF, TCA 2 received fluid from TCA 3, and TCA 3 receives fluid from TCA 2. In stage 5, TCA 1 receives fluid from TCA 2, TCA 2 receives fluid from TCA 1, and TCA 3 undergoes regeneration and receives heating fluid HF. In stage six, TCA 1 receives fluid from TCA 3, TCA undergoes adsorption and receives a cooling fluid CF, and TCA 3 receives fluid from TCA 1.

Table 3 below shows a series of stages that can be utilized to perform a cycle of adsorption and regeneration with a multi bed temperature controlled adsorption system that includes six temperature controlled adsorbers. Table 3 shows a series of six stages, during which each adsorber undergoes steps including adsorption, a first bed to bed interchange, a second bed to bed interchange, regeneration, a third bed to bed interchange, and a fourth bed to bed interchange. The first bed to bed interchange and the second bed to bed interchange can pre-heat a TCA prior to undergoing a subsequent regeneration step. The third bed to bed interchange and the fourth bed to bed interchange can pre-cool a TCA prior to undergoing a subsequent adsorption step.

TABLE 3

| Stage | TCA 1 | TCA 2 | TCA 3 | TCA 4 | TCA 5 | TCA 6 |
|---|---|---|---|---|---|---|
| #1 | HF | 6 | 5 | CF | 3 | 2 |
| #2 | 3 | HF | 1 | 6 | CF | 4 |
| #3 | 5 | 4 | HF | 2 | 1 | CF |
| #4 | CF | 6 | 5 | HF | 3 | 2 |
| #5 | 3 | CF | 1 | 6 | HF | 4 |
| #6 | 5 | 4 | CF | 2 | 1 | HF |

In stage one of Table 3, TCA 1 undergoes regeneration and receives a heating fluid HF, TCA 2 receives fluid from TCA 6, TCA 3 receives fluid from TCA 5, TCA 4 undergoes adsorption and receives a cooling fluid CF, TCA 5 receives fluid from TCA 3, and TCA 6 receives fluid from TCA 2. In stage two, TCA 1 receives fluid from TCA 3, TCA 2 undergoes regeneration and receives a heating fluid HF, TCA 3 receives fluid from TCA 1, TCA 4 receives fluid from TCA 6, TCA 5 undergoes adsorption and receives a cooling fluid CF, and TCA 6 receives fluid from TCA 4. In stage three, TCA 1 receives fluid from TCA 5, TCA 2 receives fluid from TCA 4, TCA 3 undergoes regeneration and receives heating fluid HF, TCA 4 receives fluid from TCA 2, TCA 5 receives fluid from TCA 1, and TCA 6 undergoes adsorption and receives cooling fluid CF. In stage 4, TCA 1 undergoes adsorption and receives cooling fluid CF, TCA 2 receives fluid from TCA 6, TCA 3 receives fluid from TCA 5, TCA 4 undergoes regeneration and receives a hating fluid HF, TCA 5 receives fluid from TCA 3, and TCA 6 receives fluid from TCA 2. In stage 5, TCA 1 receives fluid from TCA 3, TVA 2 undergoes adsorption and receives a cooling fluid CF, TCA 3 receives fluid from TCA 1, TCA 4 receievs fluid from TCA 6, TCA 5 undergoes regeneration and receives heating fluid HF, and TCA 6 receives fluid from TCA 4. In stage 6, TCA 1 receives fluid from TCA 5, TCA 2 receives fluid from TCA 4, TCA 3 undergoes adsorption and receives a cooling fluid CF, TCA 4 receives fluid from TCA 2, TCA 5 receives fluid from TCA 1, and TCA 6 undergoes regeneration and receives heating fluid HF.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A process for sorbate removal in the adsorption treatment of a process stream, the process comprising:
   providing said process stream to four temperature controlled adsorbers that operate in parallel, where each temperature controlled adsorber includes one or more adsorption flow passages, wherein said process stream flows through said adsorption flow passages and one or more heat transfer flow passages, wherein each of said one or more adsorption flow passages is adjacent to at least one of said one or more heat transfer flow passages and the one or more adsorption flow passages contain an adsorptive material coating on an adsorbent layer that defines each of said one or more adsorption flow passages wherein said adsorbent layer has a thickness from about 0.035 cm to 0.058 cm and wherein said adsorbent layer comprises a polymer and a 3A or 4A zeolite;
   cycling each temperature controlled adsorber through a continuous_series of steps including an adsorption step, a first bed to bed interchange of heat transfer fluid, a regeneration step, and a second bed to bed interchange of heat transfer fluid wherein during said first bed to bed interchange of heat transfer fluid and said second bed to bed interchange of heat transfer fluid heat is recovered from said one or more adsorption flow passages and wherein each temperature controlled adsorber is simultaneously undergoing a different step;
   removing the sorbate from the process stream during the step of adsorption and removing said sorbate from said adsorption flow passages during said regeneration step wherein said sorbate is water.

2. The process of claim 1, wherein each adsorber undergoes steps including adsorption, a first bed to bed interchange of heat transfer fluid, regeneration, and a second bed to bed interchange of heat transfer fluid.

3. The process of claim 1, wherein each temperature controlled adsorber is a plate-fin type heat exchanger.

* * * * *